US011972711B2

(12) United States Patent
Dong et al.

(10) Patent No.: US 11,972,711 B2
(45) Date of Patent: Apr. 30, 2024

(54) DISPLAY PANEL, DRIVE METHOD THEREOF AND DISPLAY APPARATUS

(71) Applicant: BOE Technology Group Co., Ltd., Beijing (CN)

(72) Inventors: Tian Dong, Beijing (CN); Shiming Shi, Beijing (CN); Bo Wang, Beijing (CN); Jingquan Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 183 days.

(21) Appl. No.: 17/415,717

(22) PCT Filed: Dec. 29, 2020

(86) PCT No.: PCT/CN2020/140683
§ 371 (c)(1),
(2) Date: Jun. 17, 2021

(87) PCT Pub. No.: WO2021/179749
PCT Pub. Date: Sep. 16, 2021

(65) Prior Publication Data

US 2022/0327974 A1 Oct. 13, 2022

(30) Foreign Application Priority Data

Mar. 11, 2020 (CN) ......................... 202010167914.2

(51) Int. Cl.
*G09G 3/20* (2006.01)

(52) U.S. Cl.
CPC ......... *G09G 3/20* (2013.01); *G09G 2300/043* (2013.01); *G09G 2310/08* (2013.01); *G09G 2320/0252* (2013.01)

(58) Field of Classification Search
CPC ............... G09G 3/20; G09G 2300/043; G09G 2310/08; G09G 2320/0252
See application file for complete search history.

(56) References Cited

U.S. PATENT DOCUMENTS 9,472,154 B2 10/2016 Hwang et al.
10,923,027 B2 * 2/2021 Dong .................. G09G 3/3266
(Continued)

FOREIGN PATENT DOCUMENTS

CN 101114433 A 1/2008
CN 101122722 A 2/2008
(Continued)

OTHER PUBLICATIONS

International Search Report for PCT/CN2020/140683 dated Mar. 25, 2021.
(Continued)

*Primary Examiner* — Sejoon Ahn
(74) *Attorney, Agent, or Firm* — Ling Wu; Stephen Yang; Ling and Yang Intellectual Property

(57) ABSTRACT

Provided are a display panel, a drive method thereof and a display apparatus. The display panel includes M*N display units disposed in an array defined by intersections of (M+1) gate lines and N pairs of data lines, and each pair of data lines include a first data line and a second data line; in an $m^{th}$ display row, display units of odd display columns are connected to an $m^{th}$ gate line, and display units of even display columns are connected to an $(m+1)^{th}$ gate line; in an $n^{th}$ display column, display units of odd display rows are connected to first data lines of an $n^{th}$ pair of data lines, and display units of even display rows are connected to second data lines of the $n^{th}$ pair of data lines.

20 Claims, 4 Drawing Sheets

(56) References Cited

U.S. PATENT DOCUMENTS

| | | | | |
|---|---|---|---|---|
| 11,367,379 | B1 * | 6/2022 | Park | G09G 3/3266 |
| 2008/0024408 | A1 | 1/2008 | Sano et al. | |
| 2008/0036933 | A1 | 2/2008 | Na et al. | |
| 2013/0027286 | A1 | 1/2013 | Zhou | |
| 2013/0141658 | A1 | 6/2013 | Lv et al. | |
| 2015/0348481 | A1 | 12/2015 | Hong et al. | |
| 2016/0217744 | A1 | 7/2016 | Song et al. | |
| 2018/0218684 | A1 * | 8/2018 | Choi | H10K 50/805 |
| 2019/0244569 | A1 | 8/2019 | Sun et al. | |

FOREIGN PATENT DOCUMENTS

| | | | |
|---|---|---|---|
| CN | 101226290 | A | 7/2008 |
| CN | 101562003 | A | 10/2009 |
| CN | 101826311 | A | 9/2010 |
| CN | 202330943 | U | 7/2012 |
| CN | 102681273 | A | 9/2012 |
| CN | 105139813 | A | 12/2015 |
| CN | 108376694 | A | 8/2018 |
| CN | 109427292 | A | 3/2019 |
| CN | 109872677 | A | 6/2019 |
| CN | 110136630 | A | 8/2019 |
| CN | 110517636 | A | 11/2019 |
| CN | 110808005 | A | 2/2020 |
| CN | 111243441 | A | 6/2020 |

OTHER PUBLICATIONS

Office Action dated Mar. 25, 2021 for Chinese Patent Application No. 202010167914.2 and English Translation.

* cited by examiner

DISPLAY PANEL, DRIVE METHOD THEREOF AND DISPLAY APPARATUS

The present application claims the priority of Chinese patent application No. 202010167914.2, filed to the CNIPA on Mar. 11, 2020 and entitled "Display Panel, Drive Method Thereof and Display Apparatus", the content of which should be regarded as being incorporated to the present application herein by reference.

TECHNICAL FIELD

The present disclosure relates to the technical field of display technology, in particular to a display panel, a drive method thereof and a display apparatus.

BACKGROUND

In recent years, Virtual Reality (VR)/Augmented Reality (AR) technology has been gradually applied to the fields such as display, games, medical, etc. Virtual reality is a kind of computer simulation technology that may create and experience virtual world. The computer generates a simulation environment in which users are immersed by using interactive 3D dynamic scene with multi-source information fusion and system simulation of entity behavior, which may bring people a brand-new visual experience, and thus gaining more and more attentions and affections from people. In addition, with the rapid development of mobile terminals, mobile games have become an important way of entertainment for young people.

In order to satisfy people's visual enjoyment in virtual reality or mobile games, display panels are required to have a higher refresh rate. However, when a refresh rate of a display panel is increased to 120 Hz, a traditional display panel structure and a drive method have a problem of an insufficient threshold voltage (Vth) compensation capacity, which leads to an uneven display.

SUMMARY

The following is a summary of subject matter described in detail herein. This summary is not intended to limit the protection scope of the claims.

The invention provides a display panel, which includes M*N display units disposed in an array defined by intersections of (M+1) gate lines and N pairs of data lines, wherein each pair of data lines include a first data line and a second data line;

in an $m^{th}$ display row, display units of odd display columns are connected to an $m^{th}$ gate line, and display units of even display columns are connected to an $(m+1)^{th}$ gate line; in an $n^{th}$ display column, display units of odd display rows are connected to a first data line of an $n^{th}$ pair of data lines, and display units of even display rows are connected to a second data line of the $n^{th}$ pair of data lines; or in the $m^{th}$ display row, the display units of the even display columns are connected to the $m^{th}$ gate line, and the display units of the odd display columns are connected to the $(m+1)^{th}$ gate line; in the $n^{th}$ display column, the display units of the even display rows are connected to the first data line of the $n^{th}$ pair of data lines, and the display units of the odd display rows are connected to the second data line of the $n^{th}$ pair of data lines;

wherein M and N are even numbers greater than or equal to 2, m=1, 2, . . . , M, n=1, 2, . . . , N.

In some possible implementations, the $m^{th}$ gate line is disposed on a side of the $m^{th}$ display row away from the $(m+1)^{th}$ display row, and the first and second data lines of the $n^{th}$ pair of data lines are disposed on both sides of the $n^{th}$ display column.

In some possible implementations, when n=2, . . . , N−1, the first data line of the $n^{th}$ pair of data lines is disposed between the $(n-1)^{th}$ display column and the $n^{th}$ display column, and the second data line of the $n^{th}$ pair of data lines is disposed between the $n^{th}$ display column and the $(n+1)^{th}$ display column; when n=1, the first data line of the first pair of data lines is disposed on a side of the first display column away from the second display column; when n=N, the second data line of the $n^{th}$ pair of data lines is disposed on a side of the $n^{th}$ display column away from the $(n-1)^{th}$ display column.

In some possible implementations, the display panel further includes a data controller, which is connected to the first data lines and the second data lines of the N pairs of data lines, and configured to enable the first data lines and the second data lines between adjacent display columns to simultaneously write display data to the display unit.

In some possible implementations, the data controller includes a first multi-way switch and a second multi-way switch, wherein the first multi-way switch is configured to enable first data lines of the odd display columns and second data lines of the even display columns to simultaneously write display data to the display unit; the second multi-way switch is configured to enable the second data lines of the odd display columns and the first data lines of the even display columns to simultaneously write display data to the display unit.

In some possible implementations, the first multi-way switch includes N/2 first switches and N/2 second switches, the N/2 first switches are respectively connected to the first data lines of the odd display columns, and the N/2 second switches are respectively connected to the second data lines of the even display columns; the second multi-way switch includes N/2 first switches and N/2 second switches, wherein the N/2 first switches are respectively connected to the first data lines of the even display columns, and the N/2 second switches are respectively connected to the second data lines of the odd display columns.

In some possible implementations, the display panel further includes a first control line and a second control line, wherein the first control line is connected to control terminals of all switches in the first multi-way switch and the second control line is connected to control terminals of all switches in the second multi-way switch; the first control line and the second control line are configured to, according to a preset timing, turn on all the switches in the first multi-way switch and turn off all the switches in the second multi-way switch; or, turn off all the switches in the first multi-way switch and turn on all the switches in the second multi-way switch.

The present disclosure further provides a display apparatus, including the foregoing display panel.

The present disclosure further provides a drive method for a display panel applied to the foregoing display panel, including: when m=2, . . . , M, outputting scan signals to an $(m-1)^{th}$ gate line and an $m^{th}$ gate line, and writing display data to the display units of the odd display columns in an $m^{th}$ display row and the display units of the even display columns in an $(m-1)^{th}$ display row; outputting scan signals to the $m^{th}$ gate line and an $(m+1)^{th}$ gate line, and writing display data to the display units of the even display columns in the $m^{th}$ display row and the display units of the odd display columns in an $(m+1)^{th}$ display row.

In some possible implementations, outputting scan signals to an $(m-1)^{th}$ gate line and an $m^{th}$ gate line, and writing display data to the display units of the odd display columns in an $m^{th}$ display row and the display units of the even display columns in an $(m-1)^{th}$ display row, includes: outputting scan signals to the $(m-1)^{th}$ gate line and the $m^{th}$ gate line, the first control line outputting on signals to the first multi-way switch, the second control line outputting off signals to the second multi-way switch, the first data line connected to the first multi-way switch writing display data to the display units of the odd display columns in the $m^{th}$ display row, and the second data line connected to the first multi-way switch writing display data to the display units of the even display columns in the $(m-1)^{th}$ display row.

In some possible implementations, outputting scan signals to the $m^{th}$ gate line and the $(m+1)^{th}$ gate line, and writing display data to the display units of the even display columns in the $m^{th}$ display row and the display units of the odd display columns in the $(m+1)^{th}$ display row; includes: outputting scan signals to the $m^{th}$ gate line and the $(m+1)^{th}$ gate line, the first control line outputting off signals to the first multi-way switch, the second control line outputting on signals to the second multi-way switch, the first data line connected to the second multi-way switch writing display data to the display units of the even display columns in the $m^{th}$ display row, and the second data line connected to the second multi-way switch writing display data to the display units of the odd display columns in the $(m+1)^{th}$ display row.

In some possible implementations, within 2 row cycles H, outputting scan signals to the $(m-1)^{th}$ gate line and the $m^{th}$ gate line, includes: outputting scan signals to the $(m-1)^{th}$ gate line in a period of t=0 to (H−b), and outputting scan signals to the $m^{th}$ gate line in a period of t=a to H; outputting scan signals to the $m^{th}$ gate line and the $m+1^{th}$ gate line, includes output scan signals to the $m^{th}$ gate line in a period of t=H to (2H−b) and outputting scan signals to the $(m+1)^{th}$ gate line in a period of t=(H+a) to 2H; in which a is less than H and b is less than H.

In some possible implementations, the first control line outputting on signals to the first multi-way switch, and the second control line outputting off signal to the second multi-way switch, includes: the first control line outputting on signal to the first multi-way switch in a period of 0 to (H−c), and the second control line outputting off signal to the second multi-way switch in a period of 0 to H; the first control line outputting off signals to the first multi-way switch and the second control line outputting on signals to the second multi-way switch, includes the first control line outputting off signals to the first multi-way switch in a period of H to 2H, the second control line outputting on signals to the second multi-way switch in a period of H to (2H−c), and outputting off signals to the second multi-way switch in a period of (2H−c) to 2H; in which c is less than H.

In some possible implementations, the drive method further includes: scan signals are output to a first gate lines, and display data are written to the display units of odd display columns in a first display row.

Other aspects will become apparent upon reading and understanding accompanying drawings and the detailed description.

BRIEF DESCRIPTION OF DRAWINGS

The attached drawings are for providing a further understanding of the technical scheme of the present disclosure and constitute a part of the description. They are for explaining the technical scheme of the present disclosure together with the embodiments of the present application and do not constitute a limitation on the technical scheme of the present disclosure. Shapes and sizes of various components in the drawings do not reflect true scales and are intended to illustrate schematically contents of the present disclosure only.

DESCRIPTION OF REFERENCE SIGNS

Figure 1:
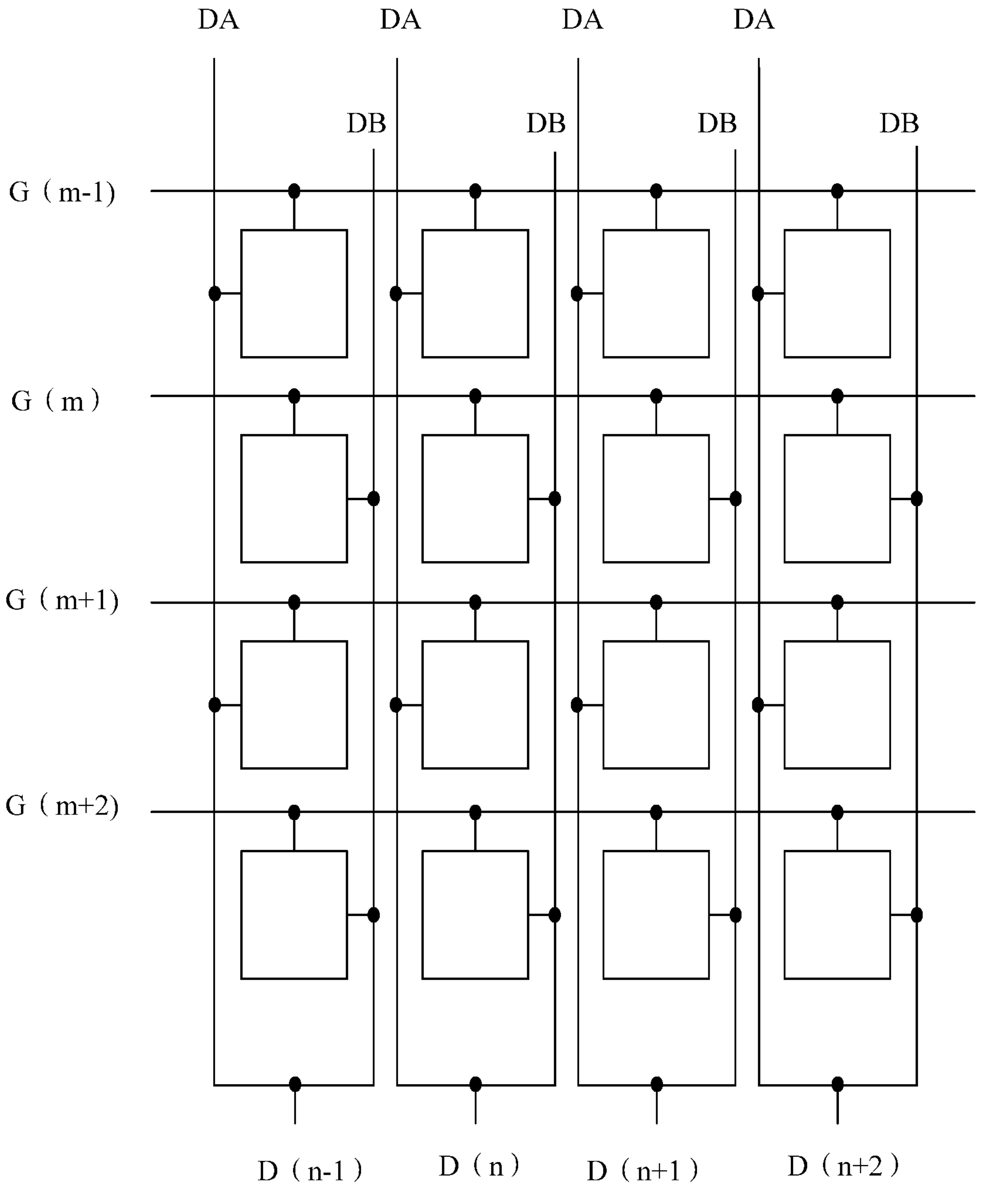
FIG. 1 is a schematic diagram of a structure of a display panel.

10—first multi-way switch;
20—second multi-way switch;
30—first control line;
40—second control line;
100—data controller.

DETAILED DESCRIPTION

To make the objects, technical solutions and advantages of the present disclosure more clear, embodiments of the present disclosure will be described in detail below with reference to the drawings. The embodiments may be implemented in a number of different forms. Those of ordinary skills in the art may readily understand the fact that implementations and contents may be transformed into a variety of forms without departing from the spirit and scope of the present disclosure. Therefore, the present disclosure should not be construed as being limited only to what is described in the following embodiments. The embodiments and features in the embodiments in the present disclosure may be combined randomly if there is no conflict.

In the drawings, sizes of various constituent elements and thicknesses and regions of layers are sometimes exaggerated for clarity. Therefore, an implementation of the present disclosure is not necessarily limited to the size shown, and the shapes and sizes of the components in the drawings do not reflect true proportions. In addition, the drawings schematically show ideal examples, and an implementation of the present disclosure is not limited to the shapes or values shown in the drawings.

The ordinal numbers "first", "second", "third" and the like in this specification are used to avoid confusion between constituent elements, but not to constitute limitations on quantities.

In this description, for sake of convenience, words indicating orientation or positional relations, such as "central", "upper", "lower", "front", "rear", "vertical", "horizontal", "top", "bottom", "inner", "outer" and the like which are used to describe the positional relations between constituent elements with reference to the drawings, the words are only for a purpose of facilitating description of this specification and simplifying the description, rather than indicating or implying that the apparatus or element referred to must have a specific orientation, or must be constructed and operated in a particular orientation, and therefore may not be construed as limitations on the present disclosure. The positional relations between the constituent elements can be appropriately changed according to the directions the constituent element described. Therefore, words are not limited to the words described in the specification, and may be replaced appropriately according to situations.

In this specification, terms "install", "connect" and "couple" shall be understood in a broad sense unless otherwise explicitly specified and defined. For example, a connection may be a fixed connection, or a detachable connection, or an integrated connection; it may be a mechanical connection, or an electrical connection; it may be a direct connection, or an indirect connection through middleware, or an internal connection between two elements. For those of ordinary skills in the art, the specific meanings of the above terms in the present disclosure may be understood according to specific situations.

In this specification, a transistor refers to an element including at least three terminals, namely a gate electrode, a drain electrode and a source electrode. The transistor has a channel region between the drain electrode (a drain electrode terminal, a drain region or a drain electrode) and the source electrode (a source electrode terminal, a source region or a source electrode), and current may flow through the drain electrode, the channel region and the source electrode. In this specification, a channel region refers to a region which current mainly flows through.

In this specification, an "electrical connection" includes a case where constituent elements are connected together through an element with a certain electric action. The "element with a certain electric action" is not particularly limited as long as it may transmit and receive electrical signals between the connected constituent elements. Examples of the "element with a certain electric action" include not only electrodes and wirings, but also switching elements such as transistors, resistors, inductors, capacitors, and other elements having various functions.

A display panel has a Dual Source (also referred to as Dual data lines) structure to increase the compensation time of threshold voltage. FIG. 1 is a schematic diagram of a structure of a display panel. As shown in FIG. 1, the display panel includes M*N display units disposed in an array defined by intersections of M gate lines and N pairs of data lines, and M and N are even numbers greater than or equal to 2. Each pair of data lines include a first data line and a second data line, which are respectively disposed on both sides of a display column. For an $m^{th}$ display row, m=1, 2, . . . , M, and N display units in the $m^{th}$ display row are all connected to an $m^{th}$ gate line G(m). With respect to an $n^{th}$ display column, n=1, 2, . . . , N, two data lines in an $n^{th}$ data line D(n) are respectively connected to display units of an odd display row and display units of an even display row, that is, the display units of the odd display row in the $n^{th}$ display column is connected to a first data line D1 and the display units of the even display row is connected to a second data line D2; or the display unit of the even display row is connected to the first data line D1, and the display units of the odd display row is connected to the second data line D2. During an operation of the display panel, all the second data lines D2 write display data to all the display units in the $m^{th}$ display row in a row cycle when the $m^{th}$ gate line G(m) outputs scan signals, and all the first data lines D1 write display data to all display units in an $(m+1)^{th}$ display row in a row cycle when an $(m+1)^{th}$ gate line G(m+1) outputs scan signals.

According to research findings, the display panel has a defective display problem. As shown in FIG. 1, for a first data line DA and a second data line DB disposed between adjacent display columns, when the first data line DA writes display data to the display unit, there is no data signal on the second data line DB, thus it is in a floating state; when the second data line DB writes display data to the display unit, the first data line DA is in a floating state. As parasitic capacitance exists between the first data line DA and the second data line DB between the adjacent display columns, a voltage change on a data line in a writing state will affect a potential of a data line in a floating state, and accordingly affect a display of the display unit connected to the data line in the floating state, resulting in a defective display.

The present disclosure provides a display panel. The display panel of the present disclosure includes M*N display units disposed in an array defined by intersections of (M+1) gate lines and N pairs of data lines, and each pair of data lines include a first data line and a second data line. In an $m^{th}$ display row, a display unit of an odd display column is connected to an $m^{th}$ gate line, and a display unit of an even display column is connected to an $(m+1)^{th}$ gate line; in an $n^{th}$ display column, a display unit of an odd display row is connected to a first data line of an $n^{th}$ pair of data lines, and a display unit of an even display row is connected to a second data line of the nth pair of data lines. Or, in the $m^{th}$ display row, the display unit of the even display column is connected to the $m^{th}$ gate line, and the display unit of the odd display column is connected to the $(m+1)^{th}$ gate line; in the $n^{th}$ display column, the display unit of the even display row is connected to the first data line of the $n^{th}$ pair of data lines, and the display unit of the odd display row is connected to the second data line of the $n^{th}$ pair of data lines. Wherein, m and n may be even numbers greater than or equal to 2, m=1, 2, . . . , M, n=1, 2, . . . , N. An intersection of a gate line and a data line means that a gate line and a data line cross on a projection of a substrate, but there is no direct contact between the gate line and the data line due to an existence of an insulating layer.

In an exemplary embodiment, each display unit includes a pixel drive circuit and a light emitting unit, and the pixel drive circuit is configured to drive the light emitting unit to emit light. The pixel drive circuit may have structures of 2T1C, 3T1C, 5T1C or 7T1C and includes a drive terminal and a data writing terminal. A gate line being connected to a display unit means that a gate line is connected to a drive terminal of a pixel drive circuit in a display unit, and a data line being connected to a display unit means that a data line is connected to a data writing terminal of the pixel drive circuit in the display unit.

Figure 2:
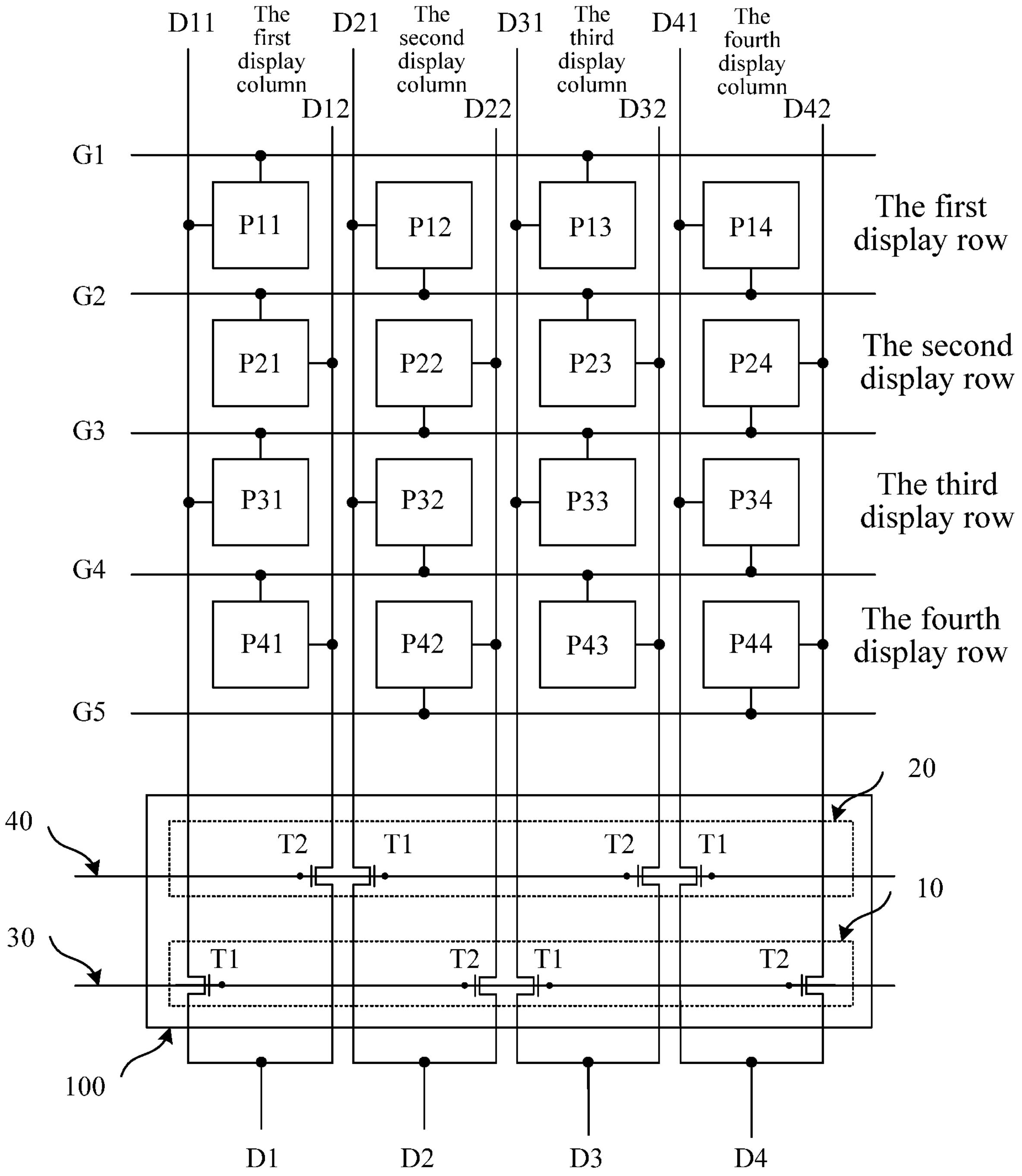
FIG. 2 is a schematic diagram of a structure of a display panel according to the present disclosure.

FIG. 2 is a schematic diagram of a structure of a display panel according to the present disclosure, taking structures of a first to a fourth display rows and a first to a fourth display columns as an example. As shown in FIG. 2, the display panel includes M+1 gate lines and N pairs of data lines, which intersect to define M*N display units disposed in an array manner, and each pair of data lines include a first data line and a second data line.

In an $m^{th}$ display row, a display unit of an odd display column is connected to an $m^{th}$ gate line, and a display unit of an even display column is connected to an $(m+1)^{th}$ gate line; in an $n^{th}$ display column, a display unit of an odd display row is connected to a first data line of an $n^{th}$ pair of data lines, and a display unit of an even display row is connected to a second data line of the $n^{th}$ pair of data lines. Wherein, M and N may be even numbers greater than or equal to 2, m=1, 2, . . . , M, n=1, 2, . . . , N.

M display rows are defined by M+1 gate lines (G1, G2, G3, G4, . . . ) disposed in parallel. The $m^{th}$ display row is defined by the $m^{th}$ gate line and the $(m+1)^{th}$ gate line. The $m^{th}$ gate line is disposed on an upper side of the $m^{th}$ display row and the $(m+1)^{th}$ gate line is disposed on a lower side of the $m^{th}$ display row, that is the $m^{th}$ gate line is disposed on a side of the $m^{th}$ display row away from the $(m+1)^{th}$ display row. Or, when m=2, . . . , M, the $m^{th}$ gate line is disposed between an $(m-1)^{th}$ display row and and the $m^{th}$ display row, and the $(m+1)^{th}$ gate line is disposed between the $m^{th}$ display row and the $(m+1)^{th}$ display row. For example, a third gate line G3 and a fourth gate line G4 define a third display row, the third gate line G3 is disposed on an upper side of the third display row, and the fourth gate line G4 is disposed on a lower side of the fourth display row.

In N pairs of data lines (D1, D2, D3, D4, . . . ) disposed in parallel, each pair of data lines include two data lines, namely a first data line and a second data line, which are respectively disposed on both sides of each display column, and define the display column where they are located. When n=1, a first data line of a first pair of data lines is disposed on a side of a first display column away from a second display column. When n=2, . . . , N−1, a first data line of the $n^{th}$ pair of data lines is disposed between an $(n-1)^{th}$ display column and the $n^{th}$ display column, and a second data line of the $n^{th}$ pair of data lines is disposed between the $n^{th}$ display column and an $(n+1)^{th}$ display column. When n=N, a second data line of the $n^{th}$ pair of data lines is disposed on a side of the $n^{th}$ display column away from the $(n-1)^{th}$ display column. For example, a third pair of data lines D3 includes a first data line D31 and a second data line D32, which define a third display column. The first data line D31 is disposed between a second display column and the third display column, and the second data line D32 is disposed between the third display column and a fourth display column.

The M display rows include M/2 odd display rows and M/2 even display rows, and the display units of the odd display rows and those of the even display rows are respectively connected to different data lines. N display columns include N/2 odd display columns and N/2 even display columns, and the display units of the odd display columns and those of the even display columns are respectively connected to different gate lines. In the $m^{th}$ display row, the display units of the odd display columns are connected to the $m^{th}$ gate line, and the display units of the even display columns are connected to the $(m+1)^{th}$ gate line. In the $n^{th}$ display column, the display units of the odd display rows are connected to the first data lines of the $n^{th}$ pair of data lines, and the display units in the even display rows are connected to the second data lines of the $n^{th}$ pair of data lines.

Next, a connection structure of each display unit will be explained with examples of a second display row, a third display row, a second display column and a third display column shown in FIG. 2.

The second display row is an even row, and all display units of the second display row are connected to the second data lines of the display column where the display units are located. In the second display row, a display unit P21 of the first display column is connected to a second data line D12 of the first display column, a display unit P22 of the second display column is connected to a second data line D22 of the second display column, a display unit P31 of the third display column is connected to a second data line D32 of the third display column, and a display unit P42 of the fourth display column is connected to a second data line D42 of the fourth display column.

The third display row is an odd row, and each display unit in the third display row is connected to a first data line of the display column where the display unit is located. In the third display row, a display unit P31 of the first display column is connected to a first data line D11 of the first display column, a display unit P32 of the second display column is connected to a first data line D21 of the second display column, a display unit P33 of the third display column is connected to a first data line D31 of the third display column, and a display unit P34 of the fourth display column is connected to a first data line D41 of the fourth display column.

The second display column is an even column, and each display unit of the second display column is connected to a gate line below the row where the display unit is located. In the second display column, a display unit P12 of the first display row is connected to a second gate line G2 below the first display row, a display unit P22 of the second display row is connected to a third gate line G3 below the second display row, a display unit P32 of the third display row is connected to a fourth gate line G4 below the third display row, and a display unit P42 of the fourth display row is connected to a second gate line G5 below the fourth display row.

The third display column is an odd column, and each display unit in the third display column is connected to a gate line above the row where the display unit is located. In the third display column, a display unit P13 of the first display row is connected to a first gate line G1 above the first display row, a display unit P23 of the second display row is connected to a second gate line G2 above the second display row, a display unit P33 of the third display row is connected to a third gate line G3 above the third display row, and a display unit P43 of the fourth display row is connected to a fourth gate line G4 above the fourth display row.

In an exemplary embodiment, the display panel includes a display region and a peripheral region, the peripheral region is disposed at a periphery of the display region, and M*N display units are disposed in the display region. The display panel further includes a data controller 100, which is disposed in the peripheral region, connected to a first data line and a second data line among the N pairs of data lines, and configured to enable a first data line and a second data line between adjacent display columns to simultaneously write display data to the display unit.

As shown in FIG. 2, the data controller 100 includes a first multi-way switch 10, a second multi-way switch 20, a first control line 30 and a second control line 40, which are configured to turn on all switches in the first multi-way switch 10 and turn off all switches in the second multi-way switch 20 according to a preset timing; or configured to turn off all the switches in the first multi-way switch 10 and turn on all the switches in the second multi-way switch 20 according to the preset timing. The first multi-way switch 10 includes N switches, control terminals of which are all connected to the first control line 30, and the first control line 30 controls the N switches in the first multi-way switch 10 to be simultaneously turned on or off, so that display data output from the first data lines of the odd display columns and the second data lines of the even display columns are simultaneously input to the display unit. The second multi-way switch 20 includes N switches, the control terminals of which are all connected to the second control line 40, and the second control line 40 controls the N switches in the second multi-way switch 20 to be simultaneously turned on or off, so that display data output from the second data lines of the odd display columns and the first data lines of the even display columns are simultaneously input to the display unit.

In an exemplary embodiment, the first multi-way switch 10 includes N/2 first switches T1 and N/2 second switches T2, and the second multi-way switch 20 includes N/2 first switches T1 and N/2 second switches T2. The first control line 30 and the second control line 40 are configured to turn on all the first switches T1 and the second switches T2 in the first multi-way switch 10 and turn off all the first switches T1 and the second switches T2 in the second multi-way switch 20 in a row cycle, and turn on all the first switches T1 and the second switches T2 in the second multi-way switch 20, and turn off all the first switches T1 and the second switches T2 in the first multi-way switch 10 in another row cycle according to a preset timing.

In the first multi-way switch 10, the N/2 first switches T1 are respectively connected to the first data lines of the odd display columns, and are configured to be turned on according to a preset timing, so that display data from the first data lines are input to the display units of the odd display rows in the odd display columns; the N/2 second switches T2 are respectively connected to the second data lines of the even display columns, and are configured to be turned on according to a preset timing, so that display data from the second data lines are input to the display units of the even display rows in the even display columns. As shown in FIG. 2, a first switch T1 in the first multi-way switch 10 is connected to the first data line D11 of the first display column, so that display data from the first data line D11 may be input to the display units P11 and P31 of the odd display rows in the first display column. The other first switch T1 in the first multi-way switch 10 is connected to the first data line D31 of the third display column, so that display data from the first data line D31 may be input to the display units P13 and P33 of the odd display rows in the third display column. A second switch T2 in the first multi-way switch 10 is connected to the second data line D22 of the second display column, so that display data from the second data line D22 may be input to the display units P22 and P42 of the even display rows in the second display column. The other second switch T2 in the first multi-way switch 10 is connected to the second data line D42 in the fourth display column, so that display data from the second data line D42 may be input to the display units P24 and P44 in the even display rows in the fourth display column.

In the second multi-way switch 20, the N/2 first switches T1 are respectively connected to the first data lines of the even display columns, and are configured to be turned on according to a preset timing, so that display data from the first data lines are input to the display units of the odd display rows in the even display columns; the N/2 second switches T2 are respectively connected to the second data lines of the odd display columns, and are configured to be turned on according to a preset timing, so that display data from the second data lines are input to the display units of the even display rows in the odd display columns. As shown in FIG. 2, a first switch T1 in the second multi-way switch 20 is connected to the first data line D21 of the second display column, so that display data from the first data line D21 may be input to the display units P12 and P32 of the odd display rows in the second display column. The other first switch T1 in the second multi-way switch 20 is connected to the first data line D41 of the fourth display column, so that display data from the first data line D41 may be input to the display units P14 and P34 of the odd display rows in the fourth display column. A second switch T2 in the second multi-way switch 20 is connected to the second data line D12 of the first display column, so that display data from the second data line D12 may be input to the display units P21 and P41 of the even display rows in the first display column. The other second switch T2 in the second multi-way switch 20 is connected to the second data line D32 of the third display column, so that display data from the second data line D32 may be input to the display units P23 and P43 of the even display rows in the third display column.

A technical solution of the present disclosure is described below by an example of a drive process of a display panel.

Figure 3:
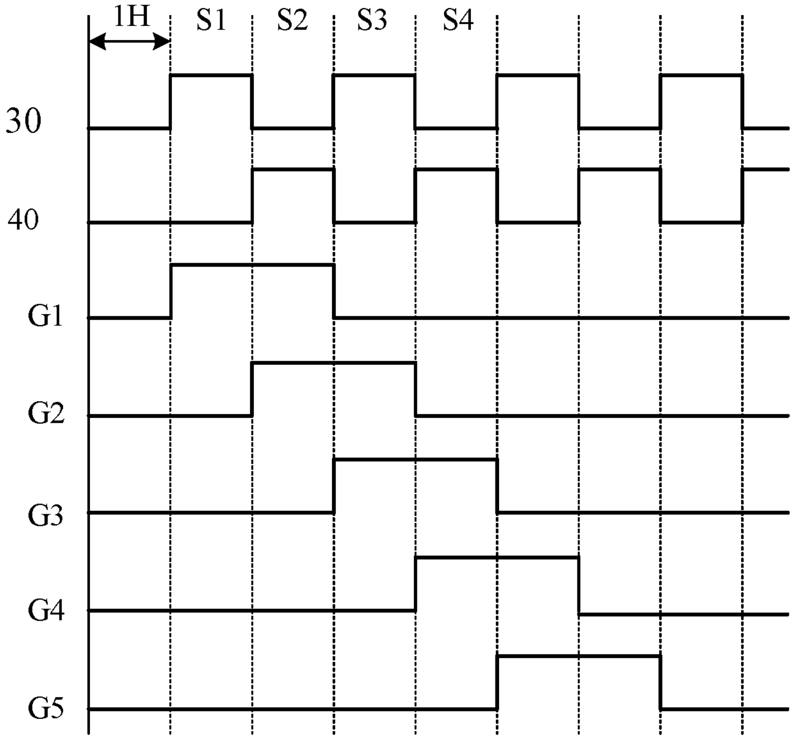
FIG. 3 is a working timing diagram of a display panel according to the present disclosure.

FIG. 3 is a working timing diagram of the display panel of the present disclosure, which illustrates a drive timing from a first display row to a fourth display row. A scan signal of a gate line is a high-level signal, on-signals of a first multi-way switch and a second multi-way switch is a high-level signal, and H is a row cycle, which is also called a writing time of display data.

As shown in FIG. 3, each gate line outputs a scan signal within two row cycles H, and an interval of start time of outputting scan signals from adjacent gate lines is a row cycle H, so that there is an overlap of a row cycle H between the scan signals output by the adjacent gate lines.

When m=2, . . . , M, during a period of an $m^{th}$ gate line outputting scan signals in two row cycles H, an $(m-1)^{th}$ gate line G is still outputting scan signals in a first row cycle H; an $(m+1)^{th}$ gate line starts outputting scan signals in a second row cycle H, and there is an overlap of one row cycle H between the scan signals output by the $(m-1)^{th}$ gate line and the scan signals output by the $m^{th}$ gate line and there is an overlap of one row cycle H between the scan signals output by the $m^{th}$ gate line G and the scan signals output by the $(m+1)^{th}$ gate line.

When m=1, during the first gate line outputs scan signals in two row cycles H, in a first row cycle H, no other gate line outputs scan signals; in a second row cycle H, the second gate line starts to output scan signals, that is, the scan signals output by the first gate line and the scan signals output by the second gate line are overlapped in the second row cycle H.

As shown in FIG. 3, during a period of each gate line outputting scan signals, one multi-way switch is switched from an on state to an off state, and the other multi-way switch is switched from an off state to an on state, that is, the two multi-way switches are turned on in a time-sharing manner. In two row cycles H while a first gate line G1 outputs scan signals, a first multi-way switch 10 is in an on state and a second multi-way switch 20 is in an off state in a first row cycle H; the first multi-switch 10 is in an off state and the second multi-switch 20 is in an on state in a second row cycle H. In two row cycles H while a second gate line G2 outputs scan signals, the first multi-way switch 10 is in an off state and the second multi-way switch 20 is in an on state in a first row cycle H; the first multi-switch 10 is in an on state and the second multi-switch 20 is in an off state in a second row cycle H. In two row cycles H while a third gate line G3 outputs scan signals, the first multi-way switch 10 is in an on state and the second multi-way switch 20 is in an off state in a first row cycle H; the first multi-switch 10 is in an off state and the second multi-switch 20 is in an on state in a second row cycle H. In two row cycles H while a fourth gate line G4 outputs scan signals, the first multi-way switch 10 is in an off state and the second multi-way switch 20 is in an on state in a first row cycle H; the first multi-switch 10 is in an on state and the second multi-switch 20 is in an off state in a second row cycle H.

As shown in FIG. 3, in four row cycles H, the drive process of the display panel of the present disclosure includes:

1. In S1 period (t=0 to H), the first gate line G1 outputs scan signals, the first control line 30 outputs on signals to the first multi-way switch 10, and the second control line 40 outputs off signals to the second multi-way switch 20.

Although both the first switch T1 and the second switch T2 controlled by the first multi-way switch 10 are turned on, because the first gate line G1 is connected to the display units (P11 and P13) of the odd display columns in the first display row, only display data from the first data lines (D11 and D31) connected to the first switch T1 are input to the display units (P11 and P13) of the odd display columns in the first display row, and the second data lines (D22 and D23) connected to the second switch T2 may not output display data to any display unit.

2. In S2 period (t=H to 2H), the first gate line G1 outputs scan signals, the second gate line G2 outputs scan signals, the first control line 30 outputs off signals to the first multi-way switch 10, and the second control line 40 outputs on signals to the second multi-way switch 20.

The first switch T1 and the second switch T2 controlled by the second multi-way switch 20 are both turned on, and the second gate line G2 is connected to the display units (P12 and P14) of the even display columns in the first display row and the display units (P21 and P23) of the odd display columns in the second display row, respectively. Therefore, the first data lines (D21 and D41) connected to the first switch T1 output display data to the display units (P12 and P14) of the even display columns in the first display row, and the second data lines (D12 and D32) connected to the second switch T2 output display data to the display units (P21 and P23) of the odd display columns in the second display row.

3. In S3 period (t=2H to 3H), the second gate line G2 outputs scan signals, the third gate line G3 outputs scan signals, the first control line 30 outputs on signals to the first multi-way switch 10, and the second control line 40 outputs off signals to the second multi-way switch 20.

The first switch T1 and the second switch T2 controlled by the first multi-way switch 10 are turned on. Because the third gate line G3 is connected to the display units (P22 and P24) of the even display columns in the second display row and the display units (P31 and P33) of the odd display columns in the third display row, Therefore, the first data lines (D11 and D31) connected to the first switch T1 output display data to the display units (P31 and P33) of the odd display columns in the third display row, and the second data lines (D22 and D42) connected to the second switch T2 output display data to the display units (P22 and P24) of the even display columns in the second display row.

4. In S4 period (t=3H to 4H), the third gate line G3 outputs scan signals, the fourth gate line G4 outputs scan signals, the first control line 30 outputs off signals to the first multi-way switch 10, and the second control line 40 outputs on signals to the second multi-way switch 20.

The first switch T1 and the second switch T2 controlled by the second multi-way switch 20 are both turned on, because the fourth gate line G4 is connected to the display units (P32 and P34) of the even display columns in the third display row and the display units (P41 and P43) of the odd display columns in the fourth display row, respectively. Therefore, the first data lines (D21 and D41) connected to the first switch T1 output display data to the display units (P32 and P34) of the even display columns in the third display row, and the second data lines (D12 and D32) connected to the second switch T2 output display data to the display units (P41 and P43) of the odd display columns in the fourth display row.

As seen from a drive of the $m^{th}$ gate line, within two row cycles H while the $m^{th}$ gate line outputs scan signals, a multi-way switch is in on state in a first row cycle H, and the other multi-switch is in on state in a second row cycle H. In the first row cycle H, display data are written in the display units of the odd display columns in the $m^{th}$ display row, and display data are written in the display units of the even display columns in the $(m-1)^{th}$ display row. In the second row cycle H, display data are written in the display units of the even display columns in the $m^{th}$ display row, and display data are written in the display units of the odd display columns in the $(m+1)^{th}$ display row.

When the $m^{th}$ gate line is an odd gate line, in two row cycles H while the $m^{th}$ gate line outputs scan signals, the first multi-way switch 10 is in on state and the second multi-way switch 20 is in off state in the first row cycle H; the first multi-switch 10 is in off state and the second multi-switch 20 is in on state in the second row cycle H. In the first row cycle H, display data are written in the display units of the odd display columns in the $m^{th}$ display row, and display data are written in the display units of the even display columns in the $(m-1)^{th}$ display row. In the second row cycle H, display data are written in the display units of the even display columns in the $m^{th}$ display row, and display data are written in the display units of the odd display columns in the $(m+1)^{th}$ display row.

When the $m^{th}$ gate line is an even gate line, within two row cycles H when the $m^{th}$ gate line outputs the scan signals, the first multi-way switch 10 is in off state and the second multi-way switch 20 is in on state in the first row cycle H; in the second row cycle H, the first multi-switch 10 is in on state and the second multi-switch 20 is in off state. In the first row cycle H, the display units of the odd display columns in the $m^{th}$ display row are written display data, and the display units of the even display columns in the $(m-1)^{th}$ display row are written display data. In the second row cycle H, the display units of the even display columns in the $m^{th}$ display row are written display data, and the display units of the odd display columns in the $(m+1)^{th}$ display row are written display data.

In an exemplary embodiment, the data controller may be a multiplexer (abbreviated with MUX), a scan signal of a gate line may be a high-level signal or a low-level signal, and on signals of the first and second multi-way switches may be high-level signals or low-level signals.

It may be seen from the structure and drive process of the display panel described above that, in the display panel provided by the present disclosure, by disposing layouts and drive modes of the display units, not only are display data written in different periods (time-sharing written) to the display units of the odd display columns and the display units of the even display columns in each display row, but also the display data are written in the same period (simultaneously written) to the first data line and the second data line between the adjacent display columns. When m=2, . . . , M, because each gate line outputs scan signals in two row cycles H and there is an overlap of a row cycle H between the scan signals of adjacent gate lines, thus in a first row cycle H of the $m^{th}$ gate line outputting the scan signals, the first data line outputs display data to the display units of the odd display columns in the $m^{th}$ display row, and the second data line outputs display data to the display units of the even display columns in the $(m-1)^{th}$ display row. And in a second row cycle H of the $m^{th}$ gate line outputting the scan signals, the first data line outputs display data to the display units of the odd display columns in the $(m+1)^{th}$ display row, and the second data line outputs display data to the display units of the even display columns in the $m^{th}$ display row. It may be seen that display data are written to the display units of the odd display columns in the $m^{th}$ display row in the first row cycle H, and display data are written to display units of the even display columns in the $m^{th}$ display row in the second row cycle H, thereby time-sharing writing for the display units of the odd display columns and the display units of the even display columns in a display row is achieved. In each row cycle H, display data are simultaneously written to the display units of the odd display columns and the display units of the even display columns, thereby achieving simultaneous writing of the first data line and the second data line between the adjacent display columns.

In a display panel with a traditional structure, all display units in a display column share a data line, and data voltage duration on the data line is 1H. When a pixel drive circuit charges a gate of a drive thin film transistor (TFT) through the data line, i.e., Vth compensation, a compensation time is equal to the data voltage duration, that is, the duration is 1H. In the present disclosure, because display units of odd display rows and even display rows in each display column are respectively connected to different data lines, a data voltage duration on the data lines is 2H, and the compensation time is increased by 1H, thereby increasing the compensation time of a threshold voltage of a pixel drive circuit, meeting a compensation capability of the threshold voltage at a higher refresh rate, and effectively solving a problem of insufficient compensation capability of the threshold voltage in the display panel with the higher refresh rate. As data in the first data line and the second data line between adjacent display columns are simultaneously output, a situation that one data line is in a writing state while the other data line is in a floating state is avoided, thereby eliminating factors causing mutual influence of potentials on adjacent data lines and avoiding defective display of the display panel.

For the display panel shown in FIG. 1, although a parasitic capacitance may be reduced by increasing a distance between adjacent data lines, this method not only reduces an aperture ratio, but also is affected by an alignment deviation in processes, making a pixel layout prone to generate other display defects, which reduces a yield. In the present disclosure, the display units of the odd display columns and the display units of the even display columns are respectively connected to different gate lines, and the display units of the odd display rows and the even display rows are respectively connected to different data lines, so that the pixel structure and their connection relations are neat, regular and clear, which not only simplifies a structural design of the display panel, reduces difficulties of pixel layouts, but also reduces technological defects in a preparation process, improves the production quality and effectively ensures the yield. There is no need to change the process flow, and process apparatus, no new processes is added and no new materials is introduced in the preparation process of the display panel in the present disclosure, which has good process compatibility, high process feasibility, strong practicability, and good application prospects.

According to the display panel provided by the invention, by disposing layouts and drive modes of the display units, the display units of the odd and the even display columns are respectively connected to different gate lines, and the display units of the odd and the even display rows are respectively connected to different data lines, so that display data is written to the display units of the odd display columns and the display units of the even display columns in a same display row in a time-sharing manner, and display data are simultaneously written to a first data line and a second data line between adjacent display columns, which not only avoids a deficiency of threshold voltage compensation capability of the display panel with a higher refresh rate and ensures a display effect, but also avoids the mutual influence of the potentials on the adjacent data lines and improves the display quality.

Figure 4:
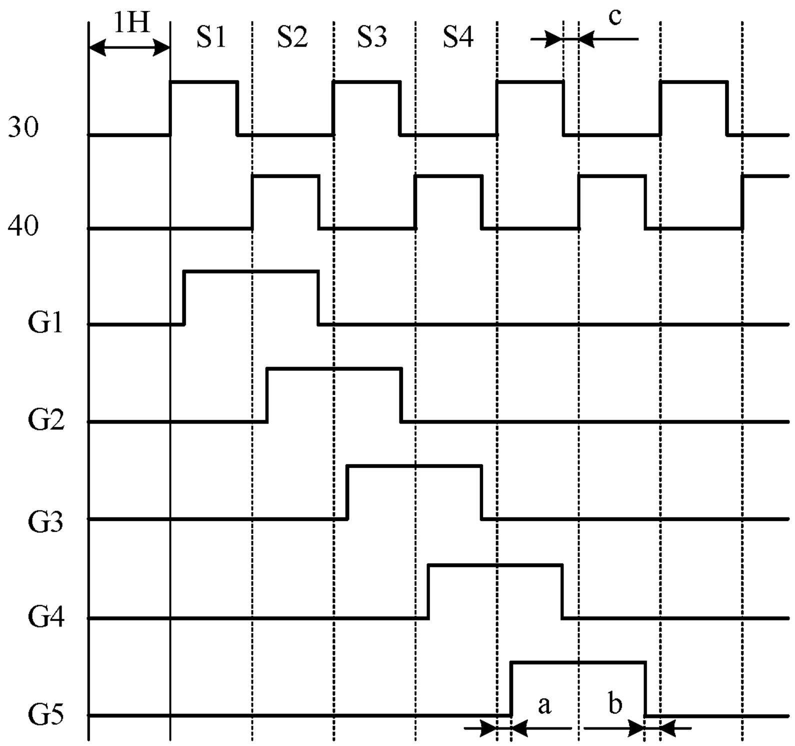
FIG. 4 is another working timing diagram of a display panel according to the present disclosure.

FIG. 4 is another working timing diagram of a display panel according to the present disclosure; In the working timing shown in FIG. 3, each gate line outputs scan signals with a level width of twice the row cycle H, and the first control line and the second control line output on signals or off signals with a level width of the row cycle H. In this embodiment, the level width of scan signals output by each gate line is 2H−(a+b), the level width of on signals output by the first and second control lines is H−c, and the level width of off signals output by the first and second control lines is H+c, as shown in FIG. 4. Other structures of the display panel in the present embodiment are similar to the corresponding structures described in the previous embodiments. Within four row cycles H, the working timing of the display panel of the present embodiment includes:

1. In S1 period (t=0 to h), the first gate line G1 outputs scan signals in a period of a to H, the first control line 30 outputs on signals in a period of 0 to (H−c) and outputs off signals in a period of (H−c) to H, and the second control line 40 outputs off signals in a period of 0 to H.

2. In S2 period (t=H to 2H), the first gate line G1 outputs scan signals in a period of H to (2H−b), the second gate line G2 outputs scan signals in a period of (H+a) to 2H, the first control line 30 outputs off signals in a period of H to 2H, and the second control line 40 outputs on signals in a period of H to (2H−c) and outputs off signals in a period of (2H−c) to 2H.

3. In S3 period (t=2H to 3H), the second gate line G2 outputs scan signals in a period of 2H to (3H−b), the third gate line G3 outputs scan signals in a period of (2H+a) to 3H, and the first control line 30 outputs on signals in a period of 2H to (3H−c) and outputs off signals in a period of (3H−c) to 3H, the second control line 40 outputs off signals in a period of 2H to 3H.

4. In S4 period (t=3H to 4H), the third gate line G3 outputs scan signals in a period of 3H to (4H−b), the fourth gate line G4 outputs scan signals in a period of (3H+a) to 4H, the first control line 30 outputs off signals in a period of 3H to 4H, and the second control line 40 outputs on signals in a period of 3H to (4H−c), and outputs off signals in a period of (4H−c) to 4H.

In each period, the first control line 30 or the second control line 40 outputs on signals with a width of (H−c) and off signals with a width of H. Both the first control line 30 and the second control line 40 output periodic waveforms of on signals with a width of (H−c) and off signals with a width of (H+C). The level width of scan signals output by each gate line is 2H−(a+b), and the scan signals start to be output at time after the first control line 30 or the second control line 40 outputs on signals, and stop to be output when the level width of the output scan signals reaches 2H−(a+b). In this way, the time when the control line outputs the conduction signal is earlier than the time when the gate line outputs the scan signal, so that the scan signals are output only after the display data transmitted by the data line connected to the first multi-way switch or the second multi-way switch are stable, to enable the display data to be written to the corresponding display unit, thus ensuring the accuracy of the writing of the display data and ensuring the display effect. In some possible implementations, a, b and c may be disposed according to actual needs, which may be a=b, a=c, b=c, or a=b=c.

Figure 5:
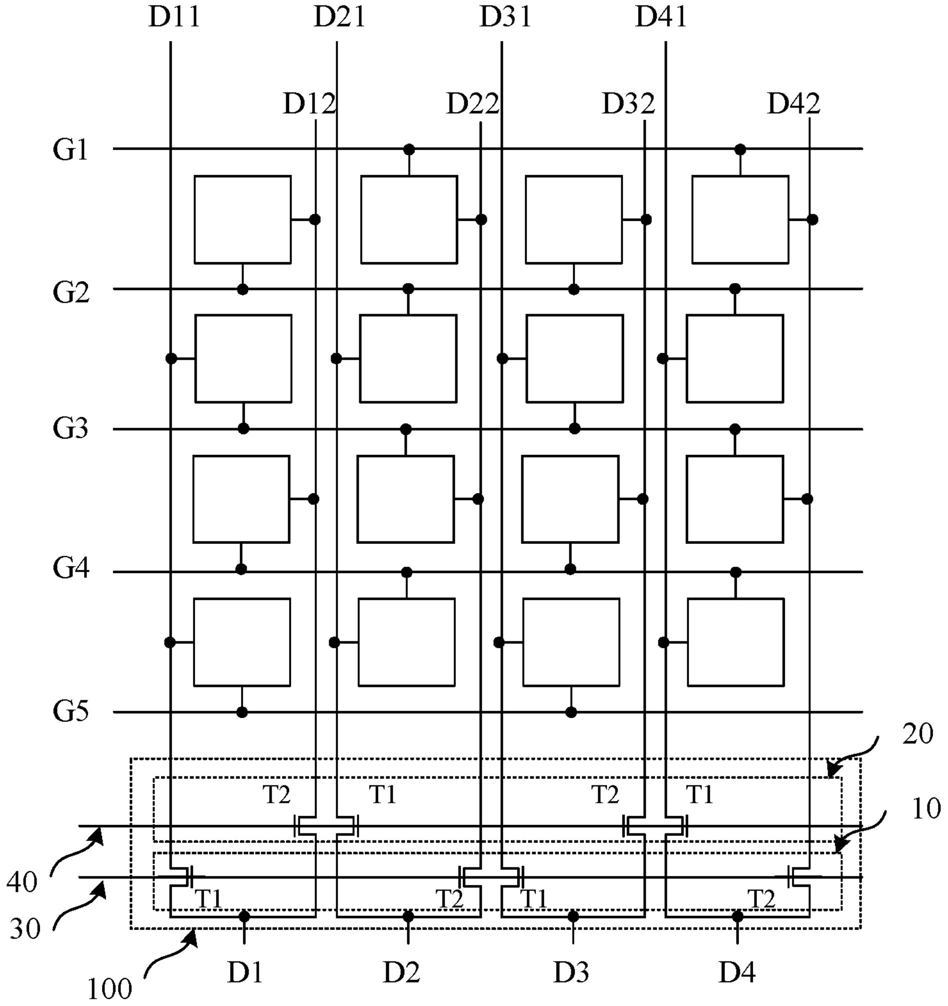
FIG. 5 is a schematic diagram of another structure of a display panel according to the present disclosure.

FIG. 5 is a schematic diagram of a structure of a display panel according to the present disclosure, illustrating structures of a first to a fourth display rows and a first to a fourth display columns. As shown in FIG. 5, the display panel includes M+1 gate lines and N pairs of data lines, which intersect to define M*N display units disposed in an array manner, and each pair of data lines include a first data line and a second data line. In the $m^{th}$ display row, the display unit of the even display column is connected to the $m^{th}$ gate line, and the display unit of the odd display column is connected to the $(m+1)^{th}$ gate line; in the $n^{th}$ display column, the display unit of the even display row is connected to the first data line of the nth pair of data lines, and the display unit of the odd display row is connected to the second data line of the $n^{th}$ pair of data lines. In which M and N are even numbers greater than or equal to 2, m=1, 2, . . . , M, n=1, 2, . . . , N. As shown in FIG. 5, the display units of the odd display rows and the even display rows are respectively connected to different data lines, and the display units of the odd display columns and the display units of the even display columns are respectively connected to different gate lines. A structure and a drive process of the data controller 100 in the present embodiment are basically the same as those in the previous embodiments, which will not be further described here.

An exemplary embodiment of the present disclosure further provides a drive method of a display panel. The display panel is a display panel in any of the foregoing embodiments. The drive method of the display panel includes the following steps: when m=2, . . . , M, S1. Outputting scan signals to the $(m-1)^{th}$ gate line and the $m^{th}$ gate line, and writing display data to the display units of the odd display columns in the $m^{th}$ display row and the even display columns in the $(m-1)^{th}$ display row;

S2. Outputting scan signals to the $m^{th}$ gate line and the $(m+1)^{th}$ gate line, and writing display data to the display units of the even display columns in the $m^{th}$ display row and the display units of the odd display columns in the $(m+1)^{th}$ display row.

In an example embodiment, step S1 includes:

scan signals are output to the $(m-1)^{th}$ gate line and the $m^{th}$ gate line, the first control line outputs on signals to the first multi-way switch, the second control line outputs off signals to the second multi-way switch, the first data line connected to the first multi-way switch outputs display data to the display units of the odd display columns in the $m^{th}$ display row, and the second data line connected to the first multi-way switch outputs display data to the display units of the even display columns in the $(m-1)^{th}$ display row.

In an example embodiment, step S2 includes:

scan signals are output to the $m^{th}$ gate line and the $(m+1)^{th}$ gate line, the first control line outputs off signals to the first multi-way switch, the second control line outputs on signals to the second multi-way switch, the first data line connected to the second multi-way switch outputs display data to the display units of the even display columns in the $m^{th}$ display row, and the second data line connected to the second multi-way switch outputs display data to the display units of the odd display columns in the $(m+1)^{th}$ display row.

In an exemplary embodiment, scan signals are output to the $(m-1)^{th}$ gate line and the $m^{th}$ gate line within two row cycles H, which includes outputting scan signals to the $(m-1)^{th}$ gate line in a period of t=0 to (H−b), and outputting scan signals to the $m^{th}$ gate line in a period of t=a to H; in which a is less than H and b is less than H.

In an exemplary embodiment, scan signals are output to the $m^{th}$ gate line and the $(m+1)^{th}$ gate line within two row cycles H, which includes outputting scan signals to the $m^{th}$ gate line in a period of t=H to (2H−b) and outputting scan signals to the $(m+1)^{th}$ gate line in a period of t=(H+a) to 2H.

In an exemplary embodiment, in two row cycles H, the first control line outputs on signals to the first multi-way switch and the second control line outputs off signals to the second multi-way switch, which includes: the first control line outputting on signals to the first multi-way switch in a period of 0 to (H−c), and the second control line outputting off signals to the second multi-way switch in a period of 0 to H; where c is less than H.

In an exemplary embodiment, the first control line outputs off signals to the first multi-way switch and the second control line outputs on signals to the second multi-way switch within 2 row cycles H, which includes: the first control line outputting off signals to the first multi-way switch in a period of H to 2H, the second control line outputting on signals to the second multi-way switch in a period of H to (2H−c), and outputting off signals to the second multi-way switch in a period of (2H−c) to 2H.

In an exemplary embodiment, a level width of the scan signal is 2H−(a+b).

In an exemplary embodiment, a level width of the on signal is H−c.

In an exemplary embodiment, the drive method further includes:

outputting scan signals to the first gate lines, and writing display data to the display units of the odd display columns in the first display row.

The present disclosure provides a drive method of a display panel. By disposing layouts and drive modes of display units, display units of odd display columns and even display columns are respectively connected to different gate lines, and display units of odd display rows and even display rows are respectively connected to different data lines, so that display data are written to the display units of the odd columns and the display units of the even display columns in a same display row in time sharing manner, and display data are written to a first data line and a second data line between adjacent display columns at a same time, which not only avoids an insufficient threshold voltage compensation capability of the display panel with a higher refresh rate and ensures a display effect, but also avoids a problem of mutual influences of potentials on adjacent data lines and improves display quality.

The present disclosure also provides a display apparatus, which includes the display panel of the foregoing embodiments. The display apparatus may be any product or component with a display function, such as a mobile phone, a tablet computer, a television, a display, a laptop computer, a digital photo frame, a navigator, etc.

Although the embodiments disclosed in the present disclosure are as described above, the described contents are only the embodiments for facilitating understanding of the present disclosure, which are not intended to limit the present disclosure. Any person skilled in the field to which the present disclosure pertains may make any modifications and variations in the forms and details of implementation without departing from the spirit and the scope disclosed by the present disclosure. However, the patent protection scope of the present disclosure shall still be subject to the scope defined in the appended claims.

What is claimed is:

1. A display panel, comprising:

display units of M display rows and N display columns, disposed in an array defined by intersections of (M+1)

gate lines and N pairs of data lines, each of the N pair of data lines comprising a first data line and a second data line;

in an $m^{th}$ display row of the M display rows, display units of odd display columns are connected to an $m^{th}$ gate line of the (M+1) gate lines, and display units of even display columns are connected to an $(m+1)^{th}$ gate line of the (M+1) gate lines; in an $n^{th}$ display column of the N display columns, display units of odd display rows are connected to the first data line of an $n^{th}$ pair of data lines of the N pairs of data lines, and display units of even display rows are connected to the second data line of the $n^{th}$ pair of data lines of the N pairs of data lines; or in the $m^{th}$ display row of the M display rows, the display units of the even display columns are connected to the $m^{th}$ gate line of the (M+1) gate lines, and the display units of the odd display columns are connected to the $(m+1)^{th}$ gate line of the (M+1) gate line; in the $n^{th}$ display column of the N display columns, the display units of the even display rows are connected to the first data line of the $n^{th}$ pair of data lines of the N pairs of data lines, and the display units of the odd display rows are connected to the second data line of the $n^{th}$ pair of data lines of the N pairs of data lines;

wherein M and N are even numbers greater than or equal to 2, m=1, 2, ..., M, n=1, 2, ..., N.

2. The display panel of claim 1, wherein the $m^{th}$ gate line is disposed on a side of the $m^{th}$ display row away from an $(m+1)^{th}$ display row, and the first data line and second data line of the $n^{th}$ pair of data lines are disposed on both sides of the $n^{th}$ display column.

3. The display panel of claim 2, wherein in a case that n=2, ..., N−1, the first data line of the $n^{th}$ pair of data lines is disposed between an $(n-1)^{th}$ display column and the $n^{th}$ display column, and the second data line of the $n^{th}$ pair of data lines is disposed between the $n^{th}$ display column and an $(n+1)^{th}$ display column; in a case that n=1, the first data line of a first pair of data lines is disposed on a side of a first display column away from a second display column; in a case that n=N, the second data line of the $n^{th}$ pair of data lines is disposed on a side of the $n^{th}$ display column away from the $(n-1)^{th}$ display column.

4. The display panel of claim 1, further comprising a data controller, wherein the data controller is connected to first data lines and second data lines of the N pairs of data lines, and configured to enable the first data lines and the second data lines between adjacent display columns to simultaneously output display data to the display units.

5. The display panel of claim 4, wherein the data controller comprises a first multi-way switch and a second multi-way switch, wherein the first multi-way switch is configured to enable the first data lines of the odd display columns and the second data lines of the even display columns to simultaneously output display data to the display units; the second multi-way switch is configured to enable the second data lines of the odd display columns and the first data lines of the even display columns to simultaneously output display data to the display units.

6. The display panel of claim 5, wherein the first multi-way switch comprises N/2 first switches and N/2 second switches, the N/2 first switches are respectively connected to the first data lines of the odd display columns, and the N/2 second switches are respectively connected to the second data lines of the even display columns; the second multi-way switch comprises N/2 first switches and N/2 second switches, wherein the N/2 first switches are respectively connected to the first data lines of the even display columns, and the N/2 second switches are respectively connected to the second data lines of the odd display columns.

7. The display panel of claim 6, further comprising a first control line and a second control line, wherein the first control line is connected to control terminals of all switches in the first multi-way switch and the second control line is connected to control terminals of all switches in the second multi-way switch; the first control line and the second control line are configured to, according to a preset timing, turn on all the switches in the first multi-way switch and turn off all the switches in the second multi-way switch; or, turn off all the switches in the first multi-way switch and turn on all the switches in the second multi-way switch.

8. A display apparatus comprising a display panel, wherein the display panel comprises:

display units of M display rows and N display columns, disposed in an array defined by intersections of (M+1) gate lines and N pairs of data lines, each of the N pair of data lines comprising a first data line and a second data line;

in an $m^{th}$ display row of the M display rows, display units of odd display columns are connected to an $m^{th}$ gate line of the (M+1) gate lines, and display units of even display columns are connected to an $(m+1)^{th}$ gate line of the (M+1) gate lines; in an $n^{th}$ display column of the N display columns, display units of odd display rows are connected to the first data line of an $n^{th}$ pair of data lines of the N pairs of data lines, and display units of even display rows are connected to the second data line of the $n^{th}$ pair of data lines of the N pairs of data lines; or in the $m^{th}$ display row of the M display rows, the display units of the even display columns are connected to the $m^{th}$ gate line of the (M+1) gate lines, and the display units of the odd display columns are connected to the $(m+1)^{th}$ gate line of the (M+1) gate lines; in the $n^{th}$ display column of the N display columns, the display units of the even display rows are connected to the first data line of the $n^{th}$ pair of data lines of the N pairs of data lines, and the display units of the odd display rows are connected to the second data line of the $n^{th}$ pair of data lines of the N pairs of data lines;

wherein M and N are even numbers greater than or equal to 2, m=1, 2, . . . , M, n=1, 2, . . . , N.

9. A drive method applied to a display panel of claim 1, wherein the display panel comprises:

display units of M display rows and N display columns, disposed in an array defined by intersections of (M+1) gate lines and N pairs of data lines, each of the N pair of data lines comprising a first data line and a second data line;

in an $m^{th}$ display row of the M display rows, display units of odd display columns are connected to an $m^{th}$ gate line of the (M+1) gate lines, and display units of even display columns are connected to an $(m+1)^{th}$ gate line of the (M+1) gate lines; in an $n^{th}$ display column of the N display columns, display units of odd display rows are connected to the first data line of an $n^{th}$ pair of data lines of the N pairs of data lines, and display units of even display rows are connected to the second data line of the $n^{th}$ pair of data lines of the N pairs of data lines; or in the $m^{th}$ display row of the M display rows, the display units of the even display columns are connected to the $m^{th}$ gate line of the (M+1) gate lines, and the display units of the odd display columns are connected to the $(m+1)^{th}$ gate line of the (M+1) gate lines; in the $n^{th}$ display column of the N display columns, the display units of the even display rows are connected to the first data line of the $n^{th}$ pair of data lines of the N pairs of data lines, and the display units of the odd display rows are connected to the second data line of the $n^{th}$ pair of data lines of the N pairs of data lines;

wherein M and N are even numbers greater than or equal to 2, m=1, 2, . . . , M, n=1, 2, . . . , N; the drive method comprising:

in a case that m=2, . . . , M, outputting scan signals to an $(m-1)^{th}$ gate line and the $m^{th}$ gate line, and outputting display data to the display units of the odd display columns in the $m^{th}$ display row and the display units of the even display columns in an $(m-1)^{th}$ display row;

outputting scan signals to the $m^{th}$ gate line and the $(m+1)^{th}$ gate line, and outputting display data to the display units of the even display columns in the $m^{th}$ display row and the display units of the odd display columns in an $(m+1)^{th}$ display row.

10. The drive method of claim 9, wherein, outputting scan signals to the $(m-1)^{th}$ gate line and the $m^{th}$ gate line and outputting display data to the display units of the odd display columns in the $m^{th}$ display row and the display units of even display columns in the $(m-1)^{th}$ display row comprises:

outputting scan signals to the $(m-1)^{th}$ gate line and the $m^{th}$ gate line;

outputting, by the first control line, on signals to the first multi-way switch;

outputting, by the second control line, off signals to the second multi-way switch;

outputting, by the first data lines connected to the first multi-way switch, display data to the display units of the odd display columns in the $m^{th}$ display row; and outputting, by the second data lines connected to the first multi-way switch, display data to the display units of the even display columns in the $(m-1)^{th}$ display row.

11. The drive method of claim 9, wherein outputting scan signals to the $m^{th}$ gate line and the $(m+1)^{th}$ and outputting display data to the display units of the even display columns in the $m^{th}$ display row and the display units of the odd display columns in the $(m+1)^{th}$ display row comprises:

outputting scan signals to the $m^{th}$ gate line and the $(m+1)^{th}$ gate line;

outputting, by the first control line, off signals to the first multi-way switch;

outputting, by the second control line, on signals to the second multi-way switch;

outputting, by the first data line connected to the second multi-way switch, display data to the display units of the even display columns in the $m^{th}$ display row, and outputting, by the second data line connected to the second multi-way switch, display data to the display units of the odd display columns in the $(m+1)^{th}$ display row.

12. The drive method of claim 9, wherein in 2 row cycles H:

outputting scan signals to the $(m-1)^{th}$ gate line and the $m^{th}$ gate line, comprises outputting scan signals to the $(m-1)^{th}$ gate line in a period of t=0 to (H−b), and outputting scan signals to the $m^{th}$ gate line in a period of t=a to H;

outputting scan signals to the $m^{th}$ gate line and the $(m+1)^{the}$ gate line, comprises output scan signals to the $m^{th}$ gate line in a period of t=H to (2H−b), and outputting scan signals to the $(m+1)^{th}$ gate line in a period of t=(H+a) to 2H; in which a is less than H and b is less than H.

13. The drive method of claim 12, wherein outputting, by the first control line, on signals to the first multi-way switch and outputting, by the second control line, off signals to the second multi-way switch comprises:

outputting, by the first control line, on signals to the first multi-way switch in a period of 0 to (H−c), and outputting, by the second control line, off signals to the second multi-way switch in a period of 0 to H;

wherein outputting, by the first control line, off signals to the first multi-way switch and outputting, by the second control line, on signals to the second multi-way switch comprises:

outputting, by the first control line, off signals to the first multi-way switch in a period of H to 2H;

outputting, by the second control line, on signals to the second multi-way switch in a period of H to (2H−c), and outputting, by the second control line, off signals to the second multi-way switch in a period of (2H−c) to 2H; in which c is less than H.

14. The drive method of claim 9, wherein the drive method further comprises:

outputting scan signals to a first gate line, and outputting display data to the display units of the odd display columns in a first display row.

15. The display panel of claim 2, further comprising a data controller, wherein the data controller is connected to first data lines and second data lines of the N pairs of data lines, and configured to enable the first data lines and the second data lines between adjacent display columns to simultaneously output display data to the display units.

16. The display panel of claim 3, further comprising a data controller, wherein the data controller is connected to first data lines and second data lines of the N pairs of data lines, and configured to enable the first data lines and the second data lines between adjacent display columns to simultaneously output display data to the display units.

17. The drive method of claim 10, wherein in 2 row cycles H:

outputting scan signals to the $(m-1)^{th}$ gate line and the $m^{th}$ gate line, comprises outputting scan signals to the $(m-1)^{th}$ gate line in a period of t=0 to (H−b), and outputting scan signals to the $m^{th}$ gate line in a period of t=a to H;

outputting scan signals to the $m^{th}$ gate line and the $(m+1)^{th}$ gate line, comprises output scan signals to the $m^{th}$ gate line in a period of t=H to (2H−b), and outputting scan signals to the $(m+1)^{th}$ gate line in a period of t=(H+a) to 2H; in which a is less than H and b is less than H.

18. The drive method of claim 11, wherein in 2 row cycles H:

outputting scan signals to the $(m-1)^{th}$ gate line and the $m^{th}$ gate line, comprises outputting scan signals to the $(m-1)^{th}$ gate line in a period of t=0 to (H−b), and outputting scan signals to the $m^{th}$ gate line in a period of t=a to H;

outputting scan signals to the $m^{th}$ gate line and the $(m+1)^{th}$ gate line comprises output scan signals to the $m^{th}$ gate line in a period of t=H to (2H−b), and outputting scan signals to the $(m+1)^{th}$ gate line in a period of t=(H+a) to 2H; in which a is less than H and b is less than H.

19. The drive method of claim 10, wherein the drive method further comprises:

outputting scan signals to a first gate line, and outputting display data to the display units of the odd display columns in a first display row.

20. The drive method of claim 11, wherein the drive method further comprises:

outputting scan signals to a first gate line, and outputting display data to the display units of the odd display columns in a first display row.

* * * * *